US012480232B1

(12) United States Patent
Rapp et al.

(10) Patent No.: US 12,480,232 B1
(45) Date of Patent: Nov. 25, 2025

(54) SYSTEMS AND METHODS FOR MANUFACTURING COLORED PRODUCT

(71) Applicant: Columbia Insurance Company, Omaha, NE (US)

(72) Inventors: Richard Rapp, Dalton, GA (US); Kimberly McKenzie, Dalton, GA (US); Joel Corn, Dalton, GA (US); Domenick De Cesaris, Dalton, GA (US); Brad Medley, Dalton, GA (US); Alex Freas, Dalton, GA (US); Luke Tixier, Dalton, GA (US); Berry Rentz, Dalton, GA (US); Daniela Echeverri, Dalton, GA (US); Timothy James Long, Calhoun, GA (US)

(73) Assignee: Columbia Insurance Company, Omaha, NE (US)

( * ) Notice: Subject to any disclaimer, the term of this patent is extended or adjusted under 35 U.S.C. 154(b) by 910 days.

(21) Appl. No.: 17/367,937

(22) Filed: Jul. 6, 2021

Related U.S. Application Data

(60) Provisional application No. 63/048,425, filed on Jul. 6, 2020.

(51) Int. Cl.
G01N 21/898 (2006.01)
B65H 63/00 (2006.01)
(Continued)

(52) U.S. Cl.
CPC ............ *D02H 1/00* (2013.01); *B65H 63/006* (2013.01); *D01H 1/18* (2013.01); *D01H 13/32* (2013.01);
(Continued)

(58) Field of Classification Search
CPC .. D02H 1/00; B65H 63/006; B65H 2511/411; D01H 1/18; D01H 13/32; D06H 3/08; D06H 3/00; B01F 35/2131; G01J 3/00; G01J 3/46; G01N 21/25; G01N 21/89; G01N 21/8983
See application file for complete search history.

(56) References Cited

U.S. PATENT DOCUMENTS 4,371,096 A    2/1983  Scholl et al.
5,315,366 A *  5/1994  Inada ................... B65H 63/006
                                                     242/475.8
(Continued)

FOREIGN PATENT DOCUMENTS

CN    103569793 A  *  2/2014  ........... B65H 61/005
CN    205628658 U     10/2016
(Continued)

OTHER PUBLICATIONS

Oerlikon Barmag, "Rectangular Melt Spinning Pumps for Manmade Fibers", Jan. 2014.
(Continued)

*Primary Examiner* — Michelle M Iacoletti
*Assistant Examiner* — Judy Dao Tran
(74) *Attorney, Agent, or Firm* — Ballard Spahr LLP

(57) ABSTRACT

A winder for forming a yarn package can have a spindle axis. The winder can comprise a spindle that is configured to be rotatably driven about the spindle axis. A color probe can be positioned with respect to the spindle to measure a color value of yarn wound on the spindle.

16 Claims, 6 Drawing Sheets

(51) Int. Cl.
  *D01H 1/18*   (2006.01)
  *D01H 13/32*  (2006.01)
  *D02H 1/00*   (2006.01)
  *D06H 3/08*   (2006.01)
  *B01F 35/21*      (2022.01)
  *D06H 3/00*       (2006.01)
  *G01J 3/00*       (2006.01)
  *G01J 3/46*       (2006.01)
  *G01N 21/25*      (2006.01)
  *G01N 21/89*      (2006.01)

(52) U.S. Cl.
  CPC ............ *D06H 3/08* (2013.01); *B01F 35/2131* (2022.01); *B65H 2511/411* (2013.01); *D06H 3/00* (2013.01); *G01J 3/00* (2013.01); *G01J 3/46* (2013.01); *G01N 21/25* (2013.01); *G01N 21/89* (2013.01); *G01N 21/8983* (2013.01)

(56) References Cited

U.S. PATENT DOCUMENTS

| | | | |
|---|---|---|---|
| 5,607,121 A * | 3/1997 | Boriani | B65H 26/08 |
| | | | 242/563.2 |
| 5,723,517 A | 3/1998 | Campo et al. | |
| 6,041,819 A | 3/2000 | Walleman | |
| 6,216,432 B1 * | 4/2001 | Sanfeliu Cortes | G01N 21/8915 |
| | | | 250/559.07 |
| 6,344,872 B1 * | 2/2002 | Bresee | D06H 3/08 |
| | | | 348/88 |
| 6,726,465 B2 | 4/2004 | Groleau | |
| 9,327,443 B2 | 5/2016 | Himes et al. | |
| 10,695,953 B2 | 6/2020 | Clark | |
| 10,751,915 B2 | 8/2020 | Clark | |
| 2019/0085483 A1 | 3/2019 | Clark | |
| 2020/0055213 A1* | 2/2020 | Clark | B29C 37/006 |
| 2021/0046689 A1 | 2/2021 | Torsten et al. | |

FOREIGN PATENT DOCUMENTS

| | | | |
|---|---|---|---|
| EP | 1482077 A1 | 12/2004 | |
| JP | 2001261236 A * | 9/2001 | .......... B65H 63/006 |
| JP | 4602848 B2 * | 12/2010 | |

OTHER PUBLICATIONS

Callari, J., Plastics Technology, "Extrusion/Compounding at K 2013: Having It All", https://www.ptonline.com/articles/extrusioncompounding-at-k-2013-having-it-all, Dec. 18, 2013.

Lyondell Basell, "A Guide to Polyolefin Extrusion Coating", https://www.lyondellbasell.com/globala sets/documents/polymers-technical-literature/a_guide_to_polyolefin_extrusion_coating.pdf. Accessed Apr. 2021.

* cited by examiner

SYSTEMS AND METHODS FOR MANUFACTURING COLORED PRODUCT

CROSS-REFERENCE TO RELATED APPLICATIONS

This application claims priority to and the benefit of the filing date of U.S. Provisional Patent Application No. 63/048,425, filed Jul. 6, 2020, the entirety of which is hereby incorporated by reference herein in its entirety for all purposes.

FIELD

This disclosure relates to systems and methods for manufacturing colored product, such as, for example, colored yarn, and, in particular, to measuring yarn color on a winder.

BACKGROUND

Conventionally, the color in yarn is measured by taking one or more packages (e.g., cones) of yarn from a winder into a laboratory, winding yarn from each cone on a separate card, and analyzing the card on a color spectrophotometer. However, such measurements result in delays in measurement of the color, and, in the case of a color change, result in excessive waste due to discarding cones which have achieved the desired new color, but are not sampled in a timely manner and identified as on-spec in the lab. Accordingly, a system that allows for a quicker and timelier measurement of the yarn color is desirable.

SUMMARY

Disclosed herein, in one aspect, is a winder for forming a yarn package that can have a spindle axis. The winder can comprise a spindle that is configured to be rotatably driven about the spindle axis. A color probe can be positioned with respect to the spindle to measure a color value of yarn wound on the spindle.

In various aspects, a method comprises obtaining a yarn color measurement of yarn wound on a yarn package as the yarn package is being wound. Optionally, the yarn color measurement is taken from the longitudinal end of the yarn package.

In various aspects, a method comprises obtaining a yarn color measurement of yarn, wherein the yarn color measurement is taken along a yarn path between a spinneret manifold and a yarn package around which the yarn is wound.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1:
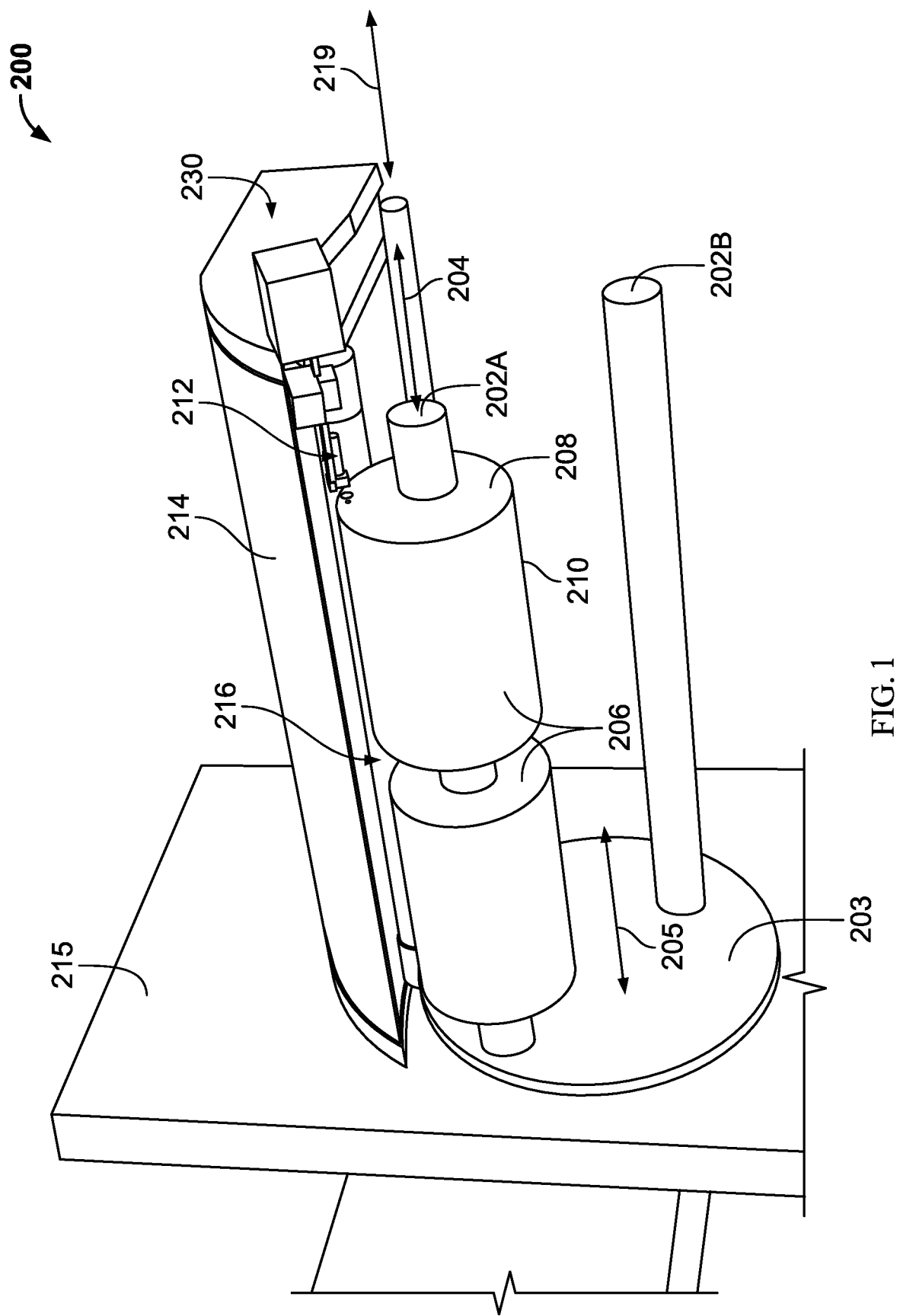
FIG. 1 is a perspective view of a winder in accordance with embodiments disclosed herein.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a spindle" includes one or more of such spindles, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects. Similarly, for antecedents "about," "substantially," or "generally," with reference to parallel or perpendicular, it is contemplated that angular offsets up to 10 degrees, or up to 5 degrees, or up to one degree are contemplated.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Figure 2:
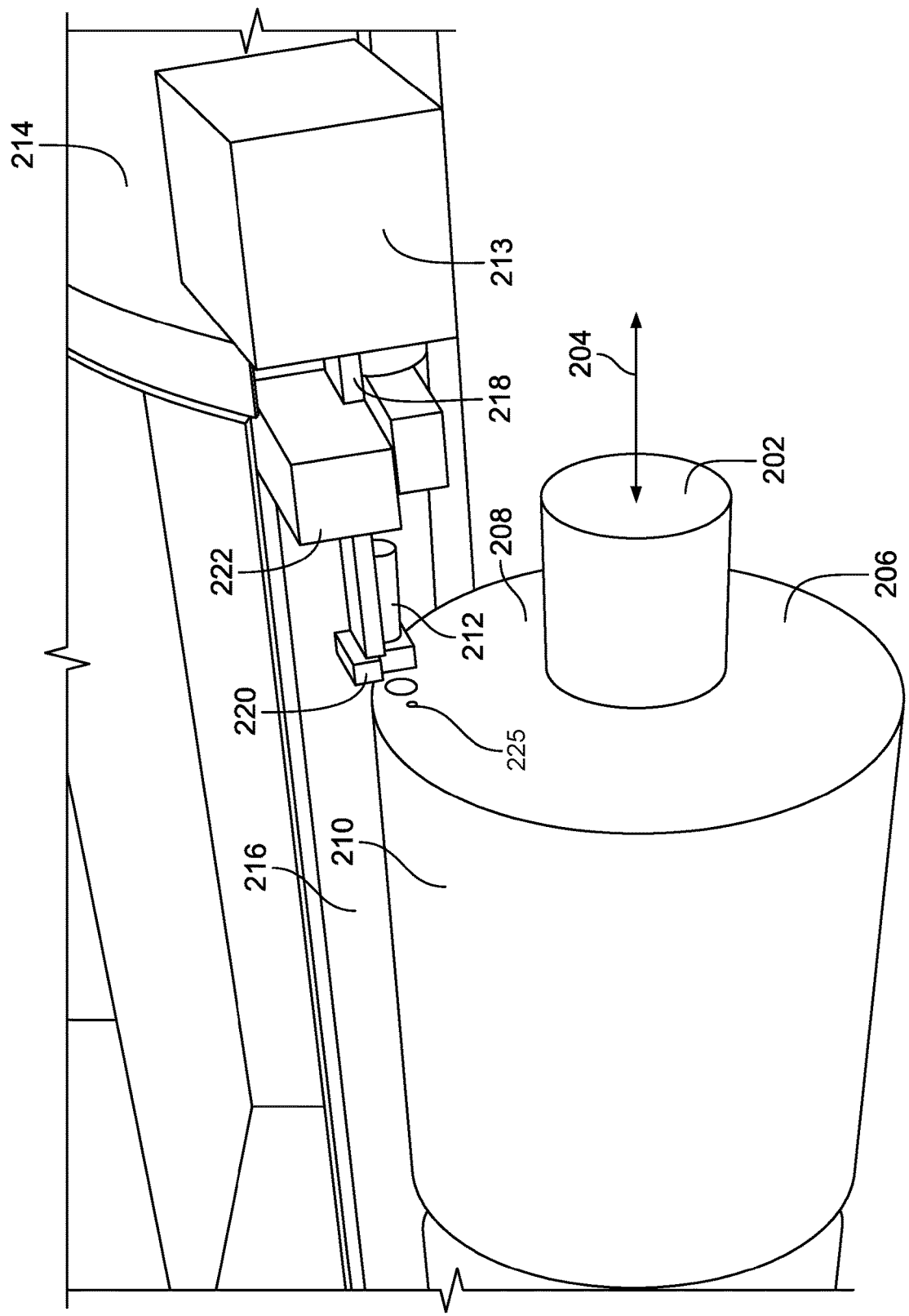
FIG. 2 is a partial close up perspective view of the winder of FIG. 1.
Figure 3:
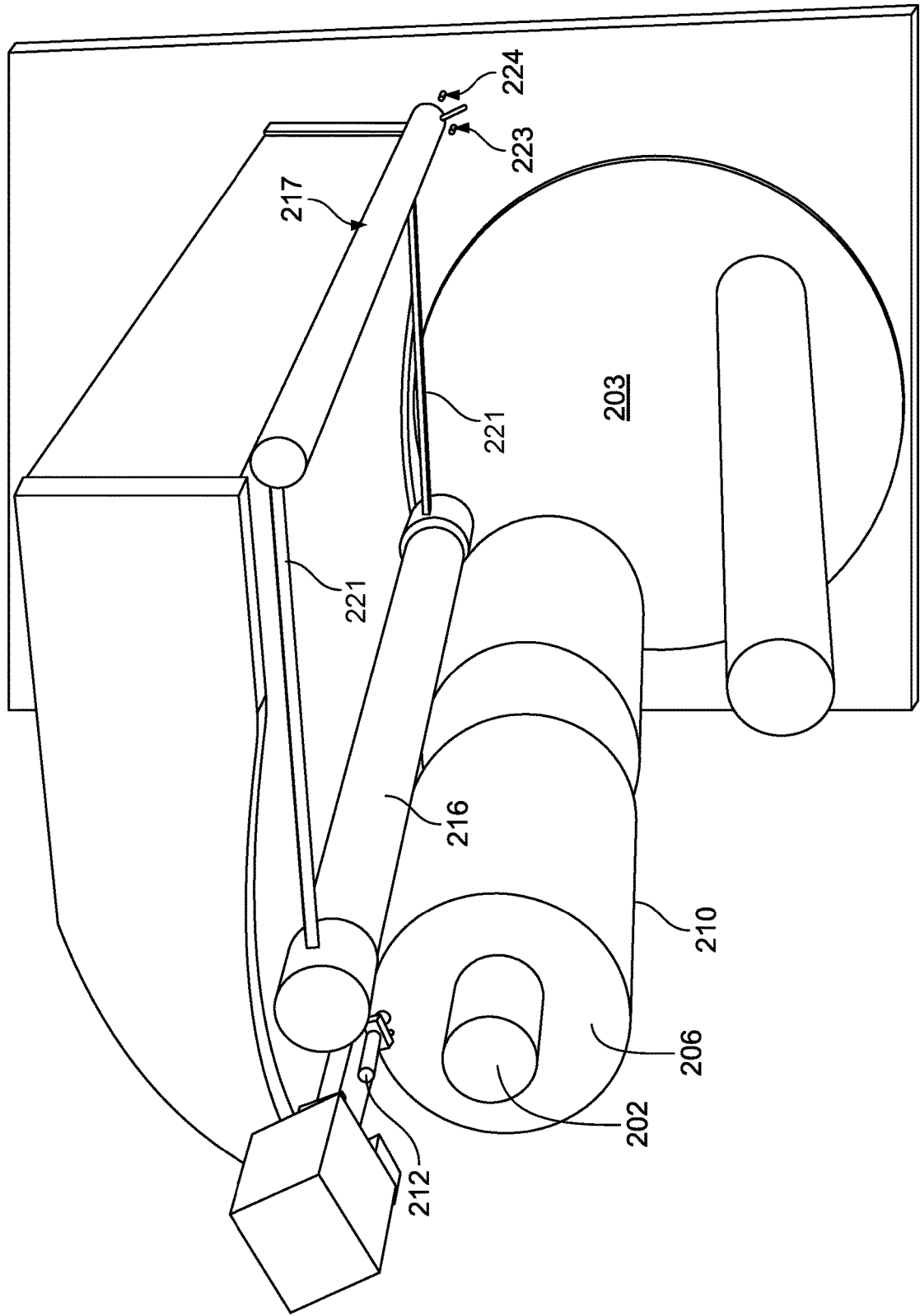
FIG. 3 is another partial close up perspective view of the winder of FIG. 1.

Disclosed herein, in various aspects and with reference to FIGS. 1-3, is a winder 200 that can be configured to measure a color of product thereon. In some optional aspects, the winder 200 can be an auto doffing winder. A panel can comprise electronic components for controlling operation of the winder 200. The winder 200 can comprise a spindle 202 that is configured to be driven about a spindle axis 204. The winder 200 can be configured to wind a yarn package 206 on the spindle 202 so that the yarn package has a longitudinal end 208 and a circumferential surface 210. The yarn package 206 can be, for example, cylindrical or conical. The yarn package 206 can have a diameter defined as a maximum radial distance between opposing sides of the outer circumference 210 of the yarn package. The winder 200 can further comprise a winder head 214 that is coupled to a frame 215. The winder 200 can comprise an engagement surface 216 that is configured to rest on, and bias against, the yarn package as it is wound on the spindle (e.g., against the circumferential surface 210 of the yarn package 206). In some optional aspects, the engagement surface 216 can be a driven friction roller (e.g., a scanner roll) biased against the yarn package 206 and rotating at a constant speed to cause the yarn to wind at a constant linear speed irrespective of the diameter of the yarn package. In further optional aspects, a motor can rotate the spindle 202, and the engagement surface 216 can be an idler roller that is configured to rotate with the yarn package and measure its surface speed.

In some aspects, the winder 200 can comprise a first spindle 202A and a second spindle 202B that are coupled to a turntable 203 that rotates about a rotational axis 205. Accordingly, the first and second spindles 202A,B can rotate about the rotational axis 205 as the turntable rotates. A stepper motor can selectively cause the turntable 203 to rotate about the rotational axis 205 of the turntable 203. The engagement surface 216 can be pivotally connected to an engagement surface pivot shaft 217 via at least one scanner roll connecting arm 221 so that, as the yarn package increases in diameter (as yarn is wound therearound), the engagement surface can pivot upwardly (clockwise in FIG. 1) about a pivot axis 219, the axis of the pivot shaft 217. The winder 200 can comprise a first limit switch 223 (FIG. 3) that is triggered when the engagement surface 216 pivots upwardly beyond a threshold. When the first limit switch 223 is triggered, the turntable 203 can rotate to move the spindle downwardly (counterclockwise in FIG. 1), thereby lowering the engagement surface 216 until a second limit switch 224 is triggered, causing the turntable 203 to cease rotation. In this way, the circumferential surface 210 of the yarn package 206 (along the area that biases against the engagement surface 216) can be maintained at a select position (within maximum and minimum spacing thresholds) of the winder head 214. That is, a portion of the circumferential surface 210 (e.g., a portion that biases against the engagement surface 216) can be maintained within a first boundary 302 (at which the turntable 203 begins to rotate) and a second boundary 304 (at which the turntable 203 ceases rotation).

The winder 200 can further comprise a color probe 212 that is configured to continuously or intermittently (e.g., every second, every five seconds, etc.) measure the color of the yarn wound around the spindle. In this way, the color of the yarn can be numerically assessed. For example, $\Delta E$ (or $\Delta E_{CMC}$) is the typical metric used to assess a color measurement vs. its color standard, as $\Delta E$ incorporates all aspects of color, such as value (lightness/darkness), hue, and chroma. However, other color values (or deltas), which are each components of AE, can be used as indicators. For instance, $\Delta L^*$ (or $\Delta L_{CMC}$) indicates the closeness of a color by assessing the lightness or darkness of the sample vs. the color standard. In further aspects, other color metrics, such as, for example, $\Delta a^*$, $\Delta b^*$, $\Delta C^*$, $\Delta H^0$, or, optionally, the sample color values: $L^*$, $L_{CMC}$, $a^*$, $b^*$, $C^*$, or $H^0$, or any other suitable color metric, can be used as an indication of the nearness of a sample's color to the defined standard. Accordingly, the color probe can be selected based upon the desired measured color metric. Knowing that the $\Delta[value]$ (e.g., $\Delta a^*$, $\Delta b^*$, $\Delta E_{CMC}$, $\Delta E$, $\Delta C^*$, $\Delta^0$) corresponds to a difference between a measured value and a desired specification value, then, in some aspects, once the desired color is achieved (e.g., when the measured color value is within a select threshold of the desired specification value), a computing device in communication with the color probe 212 can provide an indication (e.g., alarm or notification) that a production run can begin. Optionally, the yarn that was formed prior to achieving the desired color can be doffed automatically, and the production run can begin.

A controller or other computing device (e.g., computing device 1001) can be configured to receive a color measurement from the color probe 212, compare the color measurement from the color probe to a specification, and, in response to determining that the color measurement is outside of a predetermined tolerance of the predetermined specification, provide an output. For example, the controller can send an alarm to an operator, automatically adjust the letdown at a melt pump, or doff the yarn package 206 off the winder 200 (that is, reject the off-specification package). In further aspects, it is contemplated that measuring the yarn color on the winder 200 can reduce waste during color changes. For example, the end of production of the first color and beginning of production of the second color can be quickly identified. Further, measuring the yarn color on the winder 200 can detect failures such as color drifting off specification, which may indicate, for example, that the yarn is improperly tensioned or the feed rate of the color concentrate is wrong.

The winder 200 can be configured to maintain the position of the color probe 212 at a select position with respect to the yarn package 206. For example, the color probe can be maintained at a select distance (clearance) from the longitudinal end 208 of the yarn package 206. It is contemplated that the color probe 212 can have an optimal measurement distance (clearance) from the surface of the longitudinal end 208 of the yarn package 206 for accurately measuring the color of the yarn on the yarn package. In some embodiments, said optimal measurement distance can be, for example, less than 50 mm, less than 20 mm, less than 15 mm, less than 10 mm, less than 5 mm, between 5 mm and 50 mm, between 5 mm and 20 mm, or between 10 mm and 20 mm. In some optional aspects, the color probe 212 can be coupled to the winder head 214 via a mounting bracket 213 (FIG. 2). A rail 218 can couple to the mounting bracket 213. The rail 218 can be elongate and can extend parallel to, or generally parallel to, the spindle axis 204. That is, the rail 218 can be elongate along an axis that is parallel to, or generally parallel to, the spindle axis 204. The color probe 212 can movably couple to the rail 218 in order to position the color probe 212 at a select spacing from the yarn package along the spindle axis 204. For example, the color probe 212 can couple to a carriage that is movable along the rail 218, and a motor (e.g., a stepper motor) can move the carriage along the rail. A range sensor 220 (e.g., a laser range sensor) can couple to the rail 218 in a configuration so that the range sensor 220 can measure a distance to the longitudinal end 208 of the yarn package 206. In some optional aspects, the range sensor 220 can couple to the rail 218 at a fixed position along the length of the rail. In further optional aspects, the range sensor 220 can couple to the carriage so that the range sensor 220 moves along the rail 218 with the color probe 212. Optionally, the winder 200 can comprise a controller that is operative to receive a distance measurement from the range sensor 220, and based on the distance measurement, cause the stepper motor to move the color probe along the rail to adjust the spacing from the color probe to the longitudinal end of the yarn package.

In further aspects, and as illustrated in FIGS. 1-3, the color probe 212 and range sensor 220 can be fixedly coupled to the rail 218. A motor 222 (e.g., a stepper motor) can couple to the winder head 214 and can move the rail 218 along its longitudinal axis to position the color probe 212 with respect to the yarn package. The distance measurement of the range sensor 220 can be used to determine the position of the color probe 212 with respect to the longitudinal end 208 of the yarn package 206. Based on the distance measurement from the range sensor 220, the motor 222 can move the color probe 212 along the axis of the rail to position the color probe 212 at a select offset (clearance) from the longitudinal end 208 of the yarn package 206 relative to the spindle axis 204. Optionally, the winder 200 can comprise a controller that is operative to receive a distance measurement from the range sensor, and based on the distance measurement, cause the stepper motor to move the rail to adjust the spacing from the color probe to the longitudinal end of the yarn package.

In further optional aspects, the range sensor 220 can be a proximity switch. In still further optional aspects, the range sensor 220 can comprise a compressed gas source that ejects compressed gas out a nozzle. A proximity of the yarn package to the nozzle's outlet can cause a back pressure at the nozzle, and a pressure sensor can measure said back pressure to detect the proximity of (and, optionally, a distance to) the yarn package.

Figure 4:
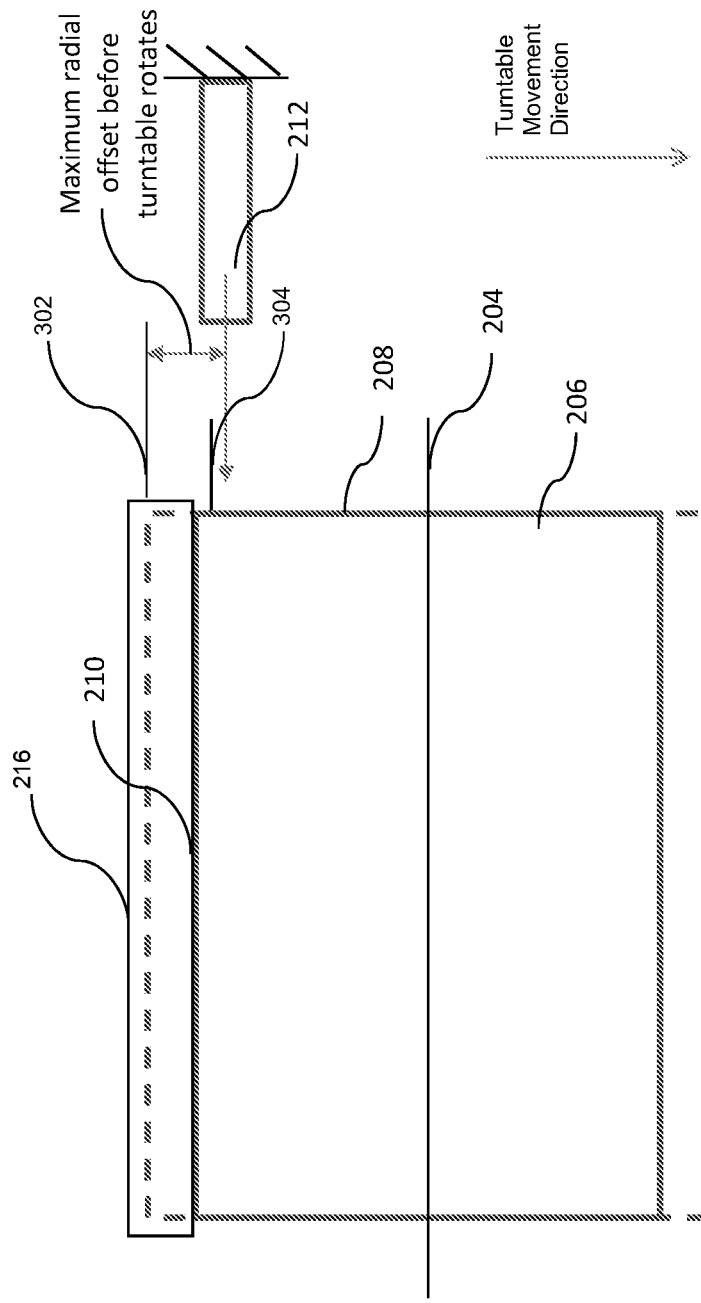
FIG. 4 is a schematic illustrating measurement of the color of a yarn package.

In addition to maintaining the color probe 212 at a select distance (clearance) from the longitudinal end 208 of the yarn package 206, the color probe can be positioned to measure an area 225 on the longitudinal end 208 of the yarn package 206 that is within a select radial offset from the circumferential surface 210 of the yarn package. It is contemplated that yarn most proximate to the outer circumference of the yarn package corresponds to the yarn most recently wound on the yarn package. Thus, in order to minimize the time delay between yarn leaving the spinneret and its color being measured at the winder 200, the color probe 212 can be positioned to measure an outer radial-most portion of the yarn package. As stated herein, the engagement surface 216 of the winder 200 rests against the yarn package 206 as it winds. Optionally, color probe 212 can be coupled to the scanner roll connecting arm 221 so that the color probe, likewise, maintains a fixed spatial relationship (e.g., radial offset) with respect to the circumferential surface 210 of the yarn package 206. Said fixed spatial relationship can be a fixed radial offset (e.g., between 1 millimeters and 30 millimeters, or between 3 millimeters and 30 millimeters, or between 5 millimeters and 30 millimeters) from the circumferential surface 210 against which the engagement surface 216 biases. In further aspects, the color probe 212 can be coupled to a fixed frame member 230 on the winder 200. Referring also to FIG. 4, as stated herein, because the turntable 203 rotates upon the pivotal movement of the engagement surface 216 after only small incremental increases in the radius of the yarn package, the portion of the circumferential surface 210 of the yarn package 206 that biases against the engagement surface 216 is maintained at a select radial offset from the color prove 212, within maximum and minimum thresholds. Thus, the color probe 212 can be positioned near the circumferential surface 210 of the yarn package 206 that the engagement surface 216 biases against. In this way, the measured area 225 of the color probe 212 can be maintained within a select radial offset of the circumferential surface 210. That is, after the yarn package 206 increases by the amount at which point the first limit switch 223 of the winder head 214 is triggered to cause the turntable 203 to rotate, the measured area 225 of the color probe 212 can be positioned at a maximum radial offset from the circumferential surface of the yarn package 206, and the turntable 203 can rotate to move the yarn package so that the circumferential surface 210 of the yarn package 206 is less than the maximum radial offset from the color probe 212. Just after the turntable 203 ceases rotation, the measured area 225 of the color probe 212 can be at a minimum offset from the circumferential surface 210. In some optional aspects, the radial offset can be less than thirty millimeters, less than twenty millimeters, less than ten millimeters, less than five millimeters, or less than two millimeters (e.g., between one millimeters and one hundred millimeters, or between three millimeters and thirty millimeters, or between five millimeters and fifty millimeters).

In further optional aspects, the color probe 212 can be configured to measure the color for yarn on the circumferential surface 210 of the yarn package 206. Accordingly, in some optional aspects, the color probe 212 can be perpendicular to, or generally perpendicular to, the spindle axis 204. It is contemplated, however, that the texture of the yarn on the circumferential surface can, in some situations, affect the detected yarn color.

The color probe 212 can further have an optimal measurement angle that corresponds with a measurement with a greatest degree of accuracy. For example, the color probe 212 can have a measuring direction that is within thirty degrees of parallel to, or within fifteen degrees of parallel to, or within ten degrees of parallel to, within five degrees of parallel to, or substantially parallel to, or parallel to the spindle axis 204, or normal to, or substantially normal to, the longitudinal end 208 of the yarn package 206.

The color probe 212 can be in communication with a computing device (e.g., computing device 1001, as further disclosed herein). The computing device can be configured to control at least one parameter associated with the color of the yarn. For example, the computing device can be configured to change a rate at which colored polymer is introduced into the manufacturing system. The computing device can, for example, change a speed of a motor that is configured to feed colored polymer to the manufacturing system, thereby changing the concentration of the colored polymer within the manufacturing system and, thus, the color of the yarn produced by the manufacturing system.

In various aspects, a method can comprise obtaining a yarn color measurement of yarn wound on a yarn package 206 as the yarn package is being wound. Optionally, the yarn color measurement is taken from the longitudinal end 208 of the yarn package 206. For example, the yarn color measurement can be taken by the color probe 212 on the winder 200. In various aspects, the distance of the color probe 212 from the longitudinal end 208 of the yarn package 206 can be adjusted (e.g., by moving the color probe relative to the yarn package based on a measurement of the distance from the color probe to the yarn package). The method can further comprise maintaining the color probe 212 within a predetermined distance of the outer circumferential surface 210 of the yarn package 206. In further optional aspects, the yarn color measurement can be taken on the outer circumferential surface 210 of the yarn package 206.

The method can further comprise determining whether the yarn color measurement is within a threshold of a specification, and, upon determining that the yarn color measurement is within the threshold of the specification, causing an event. In some effects, the event can comprise doffing the yarn package (optionally, automatically doffing) immediately after, or after a predetermined time following, a determination that the yarn color measurement is within the threshold of the specification. In further aspects, the event can comprise providing an indication (e.g., an audible alarm or a visual alarm). Said indication can inform an operator that the operator should perform an action, such as causing the winder 200 to doff or prepare a system for a production run. In various aspects, some or all of the steps of the methods disclosed herein can be performed automatically (e.g., using a computing device as disclosed herein) or by actions of an operator.

Figure 5:
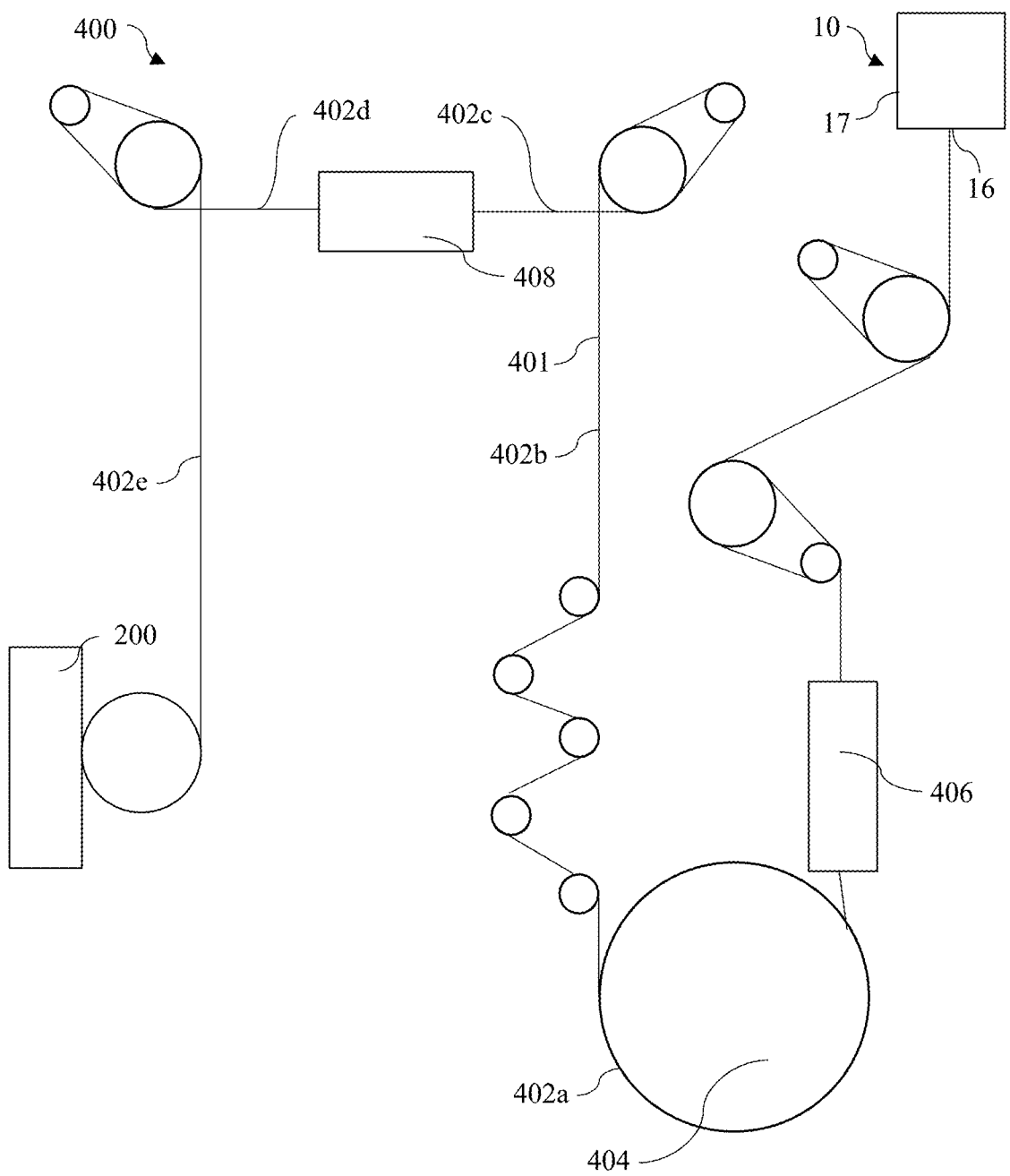
FIG. 5 is a schematic diagram of a draw-texturizing panel and winder, illustrating optional locations for locating a color probe.

In further aspects, it is contemplated that the color probe 212 (FIG. 3) can be positioned anywhere along the path of the yarn from the spinneret 16 to the winder 200. FIG. 5 illustrates a draw-texturizing panel 400 that is conventionally used in carpet yarn manufacturing. The draw texturizing panel 400 can define a yarn path 401 (or fiber line) along which the yarn passes from a spinneret manifold 17 (via the spinneret 16) to the winder 200. The draw-texturizing panel 400 can comprise a cooling drum 404, pre-draw duos, draw duos, a texturizing box or other texturizer 406, a tack box 408, and tack jet rolls. Color probe positions 402a-e indicate optional exemplary positions where the color probe 212 can be positioned, although other suitable positions are contemplated. For example, the color probe position 402a indicates a position at which the color probe measures the yarn color on the cooling drum 404. The color probe positions 402b,c indicate optional positions between the cooling drum 404 and the tack box 408 (before or after a godet). The color probe positions 402d,e indicate optional positions between the tack box 408 and the winder 200 (before or after a godet). In some aspects, it can be desirable to position the color probe 212 at a location along the yarn path after the cooling drum 404, as the yarn has substantially attained its final denier and it has been texturized, so the measured color is consistent with the color of the yarn in its final form. However, in further aspects, the color probe 212 can be positioned at any other location along the yarn path, before or after the cooling drum 404. In some optional aspects, the color probe 212 can be configured to measure the color at any point at which the yarn is fully drawn, such that the color is not over-saturated due to the yarn not achieving its final denier.

Computing Device

Figure 6:
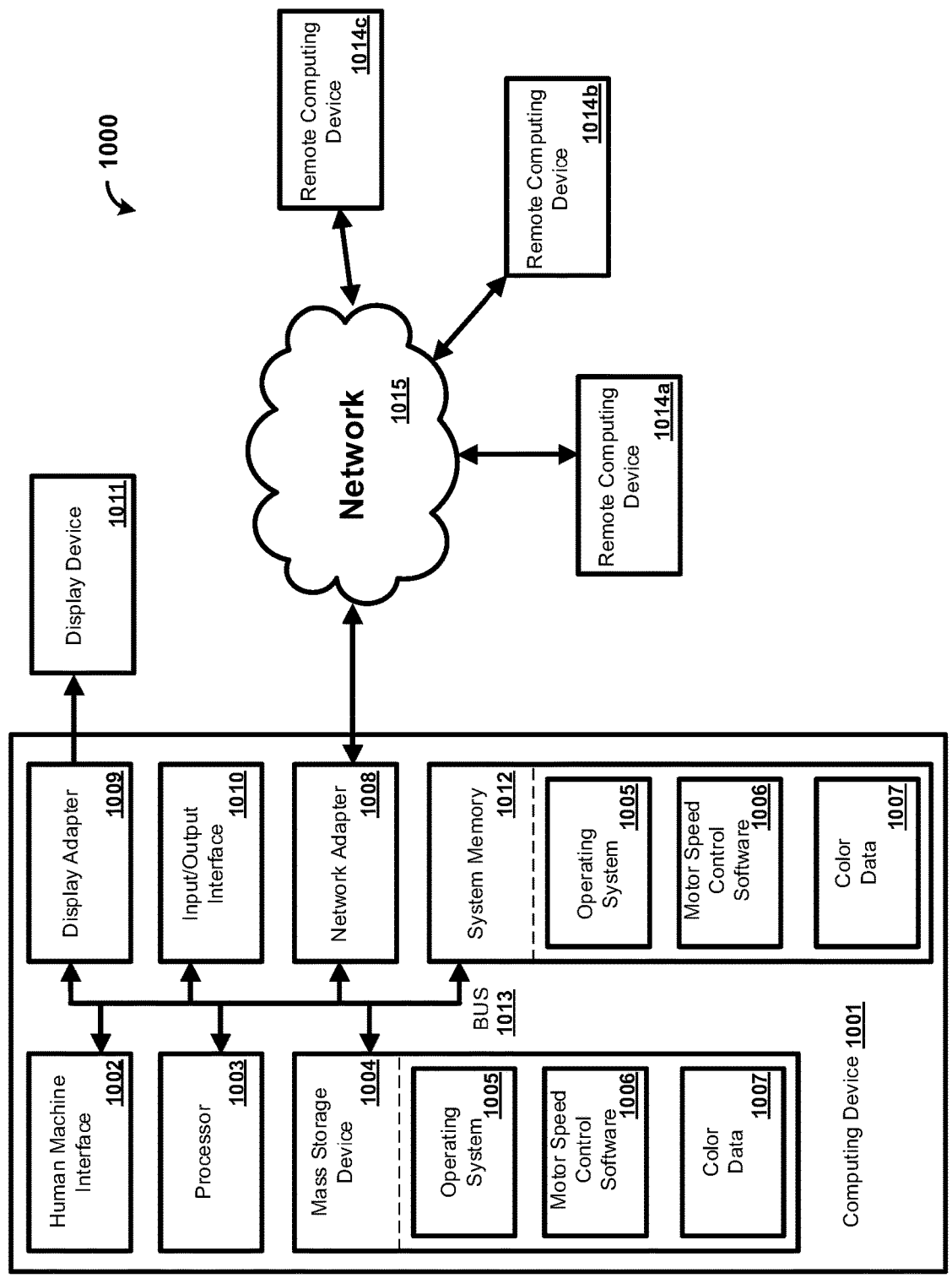
FIG. 6 is a block diagram of a computing system for use with the winder as disclosed herein.

FIG. 6 shows a computing system 1000 including an exemplary configuration of a computing device 1001 for use with a (colored yarn) manufacturing system 10. In some aspects, the computing device 1001 can be part of a plant network. In further aspects, it is contemplated that a separate computing device, such as, for example, a tablet, laptop, or desktop computer can communicate with the manufacturing system 10 and can enable the operator to interface with the manufacturing system 10.

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as color data 1007 and/or program modules such as operating system 1005 and motor speed control software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and motor speed control software 1006 may be stored on the mass storage device 1004. One or more of the operating system 1005 and motor speed control software 1006 (or some combination thereof) may comprise program modules and the motor speed control software 1006. Color data 1007 may also be stored on the mass storage device 1004. Color data 1007 may be stored in any of one or more databases known in the art. The databases may be centralized or distributed across multiple locations within the network 1015.

A user may enter commands and information into the computing device 1001 using an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display device 1011 and computing device 1001 may be part of one device, or separate devices.

The computing device 1001 may operate in a networked environment using logical connections to one or more remote computing devices 1014*a,b,c*. A remote computing device 1014*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computing device 1001 and a remote computing device 1014*a,b,c* may be made using a network 1015, such as a local area network (LAN) and/or a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014*a,b,c* can optionally have some or all of the components disclosed as being part of computing device 1001.

Exemplary Aspects

In view of the described device, systems, and methods and variations thereof, herein below are certain more particularly described aspects of the invention. These particularly recited aspects should not, however, be interpreted to have any limiting effect on any different claims containing different or more general teachings described herein, or that the "particular" aspects are somehow limited in some way other than the inherent meanings of the language literally used therein.

Aspect 1: A winder for forming a yarn package, the winder having a spindle axis and comprising:
   a. a spindle that is configured to be rotatably driven about the spindle axis; and
   b. a color probe that is positioned with respect to the spindle to measure a color value of yarn wound on the spindle.

Aspect 2: The winder of aspect 1, wherein the color probe has a measuring direction, wherein the measuring direction of the color probe is within thirty degrees of the spindle axis.

Aspect 3: The winder of aspect 2, wherein the measuring direction of the color probe is substantially parallel to the spindle axis.

Aspect 4: The winder of any one of the preceding aspects, wherein the winder is configured to position the color probe within a select radial offset from a circumferential surface of the yarn package on the spindle.

Aspect 5: The winder of aspect 4, wherein the spindle is movable on the winder about a rotational axis that is parallel to and offset from the spindle axis, wherein the spindle is configured to move about the rotational axis to maintain a portion of a circumferential surface of the yarn package in a position between select boundaries as the yarn package increases in diameter, wherein the color probe is coupled to the winder in a position proximate to the portion of the circumferential surface of the yarn package that is maintained within the select boundaries.

Aspect 6: The winder of any one of the preceding aspects, wherein the spindle is configured to wind the yarn package to have a longitudinal end, wherein the color probe is positioned on the winder to have a spacing that is less than 20 mm from the longitudinal end of the yarn package.

Aspect 7: The winder of aspect 6, wherein the color probe is adjustably coupled to the winder to adjust the spacing from the longitudinal end of the yarn package.

Aspect 8: The winder of aspect 7, further comprising:
   a. a rail that is elongate and extends parallel to the spindle axis, wherein the color probe is coupled to the rail;
   b. a stepper motor that is configured to move the rail to position the color probe relative to the longitudinal end of the yarn package;
   c. a range sensor that is configured to determine a distance to the longitudinal end of the yarn package; and
   d. a controller, wherein the controller is operative to:
     i. receive a distance measurement from the range sensor, and
     ii. based on the distance measurement, cause the stepper motor to move the rail to adjust the spacing from the color probe to the longitudinal end of the yarn package.

Aspect 9: The winder of aspect 8, wherein the range sensor is a laser range sensor.

Aspect 10: The winder of any one of the preceding aspects, further comprising a controller, wherein the controller is operative to: compare a color measurement from the color probe to a predetermined specification, and, in response to measuring the color measurement being outside of a predetermined threshold of the predetermined specification, provide an output.

Aspect 11: The winder of aspect 10 wherein the output is a signal to an alarm, wherein the alarm is one of a visible or an audible alarm.

Aspect 12: The winder of any one of the preceding aspects, wherein the color value is one of $\Delta E$, $\Delta E_{CMC}$, $\Delta L^*$, $\Delta L_{CMC}$, $\Delta a^*$, $\Delta b^*$, $\Delta C^*$, $\Delta H'$, $L^*$, $L_{CMC}$, $a^*$, $b^*$, $C^*$, or $H^o$.

Aspect 13: The winder of aspect 5, wherein the winder further comprises a turntable that is configured to rotate about the rotational axis, wherein the spindle is coupled to the turntable.

Aspect 14: The winder of any one of the preceding aspects, wherein the spindle is a first spindle, wherein the winder further comprises a second spindle that is coupled to the turntable.

Aspect 15: The winder of any one of the preceding aspects, wherein the color probe is configured to detect a color of a circumferential surface of the yarn package.

Aspect 16: The winder of aspect 15, wherein the color probe is perpendicular to, or generally perpendicular to, the spindle axis.

Aspect 17: The winder of any one of the preceding aspects, wherein the color probe is in communication with a computing device that is configured to change at least one parameter of a manufacturing system that is producing the yarn wound around the spindle.

Aspect 18: A method comprising: obtaining a yarn color measurement of yarn wound on a yarn package as the yarn package is being wound.

Aspect 19: The method of aspect 18, further comprising:
determining whether the yarn color measurement is within a threshold of a specification; and
upon determining that the yarn color measurement is within the threshold of the specification, doffing the yarn package.

Aspect 20: A method comprising: obtaining a yarn color measurement of yarn, wherein the yarn color measurement is taken along a yarn path between a spinneret manifold and a yarn package around which the yarn is wound.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A winder for forming a yarn package, the winder having a spindle axis and comprising:
   a) a spindle that is configured to be rotatably driven about the spindle axis, wherein the spindle is configured to wind the yarn package to have a longitudinal end; and
   b) a color probe that is positioned with respect to the spindle to measure a color value of yarn wound on the spindle on the longitudinal end of the yarn package.

2. The winder of claim 1, wherein the color probe has a measuring direction, wherein the measuring direction of the color probe is within thirty degrees of the spindle axis.

3. The winder of claim 2, wherein the measuring direction of the color probe is substantially parallel to the spindle axis.

4. The winder of claim 1, wherein the winder is configured to position the color probe within a select radial offset from a circumferential surface of the yarn package on the spindle.

5. The winder of claim 4, wherein the spindle is movable on the winder about a rotational axis that is parallel to and offset from the spindle axis, wherein the spindle is configured to move about the rotational axis to maintain a portion of a circumferential surface of the yarn package in a position between select boundaries as the yarn package increases in diameter, wherein the color probe is coupled to the winder in a position proximate to the portion of the circumferential surface of the yarn package that is maintained within the select boundaries.

6. The winder of claim 1, wherein the color probe is positioned on the winder to have a spacing that is less than 20 mm from the longitudinal end of the yarn package.

7. The winder of claim 6, wherein the color probe is adjustably coupled to the winder to adjust the spacing from the longitudinal end of the yarn package.

8. The winder of claim 7, further comprising:
   a) a rail that is elongate and extends parallel to the spindle axis, wherein the color probe is coupled to the rail:
   b) a stepper motor that is configured to move the rail to position the color probe relative to the longitudinal end of the yarn package:
   c) a range sensor that is configured to determine a distance to the longitudinal end of the yarn package; and
   d) a controller, wherein the controller is operative to:
      i. receive a distance measurement from the range sensor, and
      ii. based on the distance measurement, cause the stepper motor to move the rail to adjust the spacing from the color probe to the longitudinal end of the yarn package.

9. The winder of claim 8, wherein the range sensor is a laser range sensor.

10. The winder of claim 1, further comprising a controller, wherein the controller is operative to: compare a color measurement from the color probe to a predetermined specification, and, in response to measuring the color measurement being outside of a predetermined threshold of the predetermined specification, provide an output.

11. The winder of claim 10 wherein the output is a signal to an alarm, wherein the alarm is one of a visible or an audible alarm.

12. The winder of claim 1, wherein the color value is one of $\Delta E$, $\Delta ECMC$, $\Delta L^*$, $\Delta L_{CMC}$, $\Delta a^*$, $\Delta b^*$, $\Delta C^*$, $\Delta^0$, $L^*$, $L_{CMC}$, $a^*$, $b^*$, $C^*$, or $H^0$.

13. The winder of claim 5, wherein the winder further comprises a turntable that is configured to rotate about the rotational axis, wherein the spindle is coupled to the turntable.

14. The winder of claim 13, wherein the spindle is a first spindle, wherein the winder further comprises a second spindle that is coupled to the turntable.

15. The winder of claim 1, wherein the color probe is configured to detect a color of a circumferential surface of the yarn package.

16. The winder of claim 1, wherein the color probe is in communication with a computing device that is configured to change at least one parameter of a manufacturing system that is producing the yarn wound around the spindle.

* * * * *